C. F. HOWES.
Harvester Cutting Apparatus.
No. 205,092. Patented June 18, 1878.
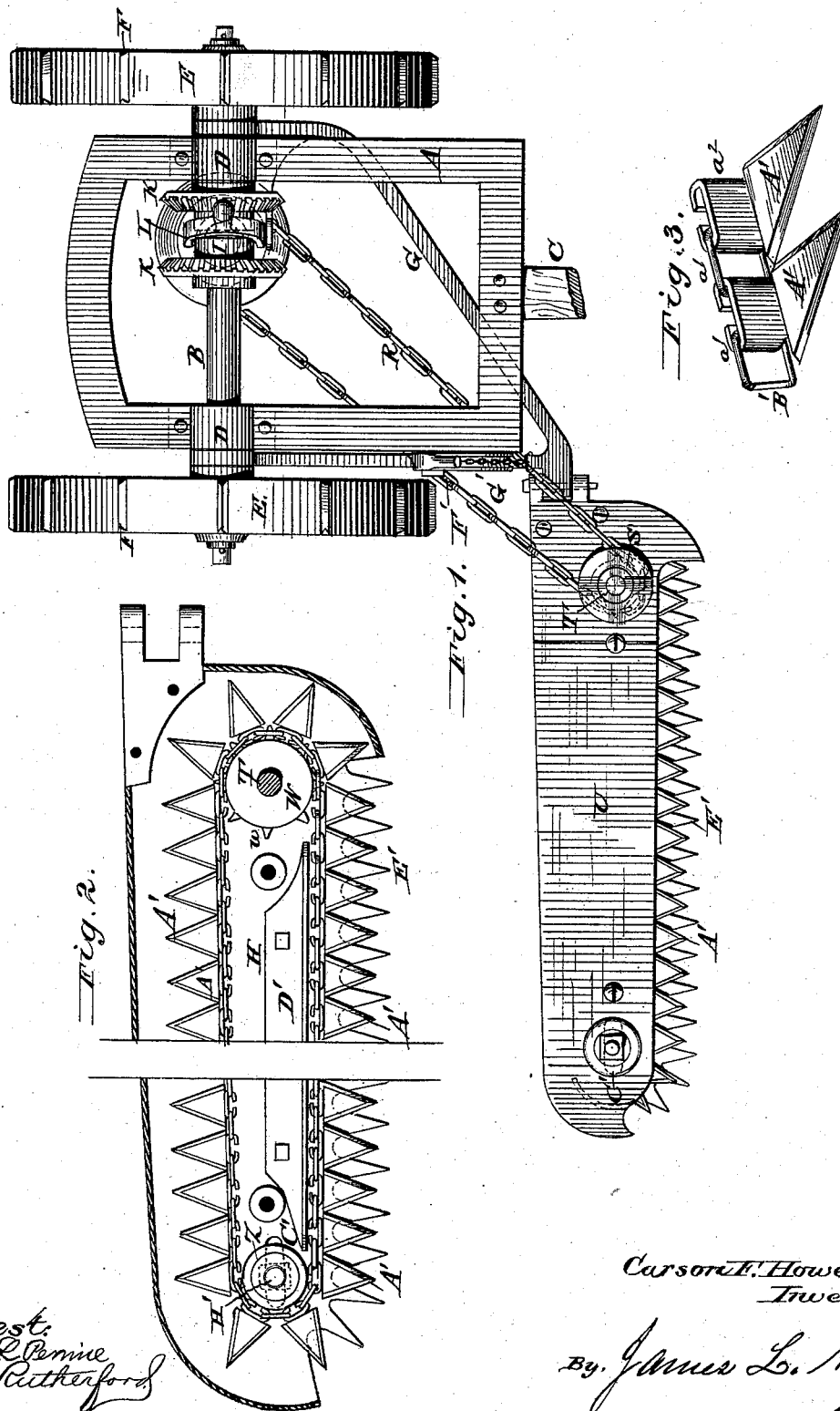

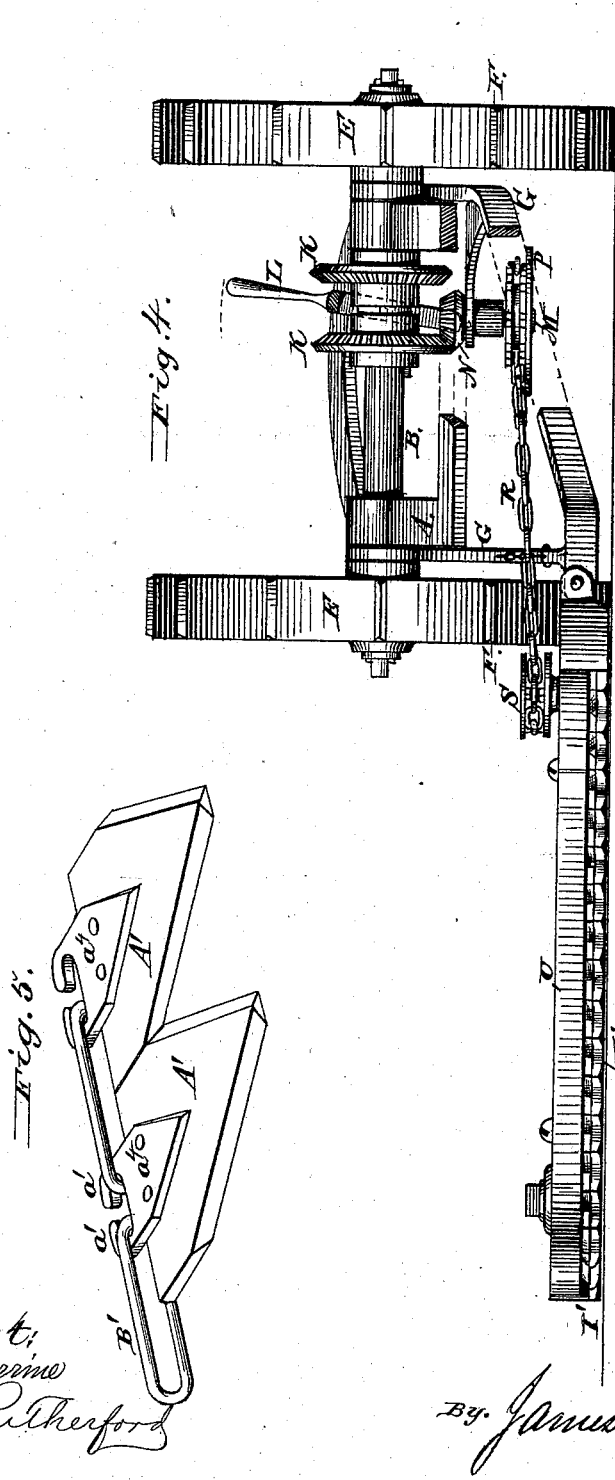

UNITED STATES PATENT OFFICE.

CARSON F. HOWES, OF MARLBOROUGH, ASSIGNOR OF ONE-HALF HIS RIGHT TO WILBUR F. BRIGHAM, OF HUDSON, MASSACHUSETTS.

IMPROVEMENT IN HARVESTER CUTTING APPARATUS.

Specification forming part of Letters Patent No. 205,092, dated June 18, 1878; application filed April 15, 1878.

*To all whom it may concern:*

Be it known that I, CARSON F. HOWES, of Marlborough, in the county of Middlesex and State of Massachusetts, have invented certain new and useful Improvements in Mowing-Machines, of which the following is a specification:

This invention relates to certain improvements in that class of harvesters in which the knives or cutters move with an endless band, passing around pulleys located at each end of the finger-bar; and it has for its object to improve the construction of the endless chain.

To this end my invention consists in an endless cutter-chain formed of separate triangular cutters having formed at their heels reversely-set hooks, outwardly beyond which project the corners of said heels, and separate loop-links engaging with the hooks and connecting the cutters, whereby is obtained a cutter-chain of great flexibility, which can be bent or turned within the limits of the cutter-heels, and is adapted to be carried by round pulleys of less diameter than chains of previous construction, and which, further, can be readily taken apart or connected together; further, in a series of cutters or knives having reversely-set hooks at their heels or bases, in combination with intermediate links, whereby the cutters are connected together and with suitable devices for actuating said cutters.

In the drawings, Figure 1 represents a top view of my improved harvester; Fig. 2, a detached view of the finger-bar with its cover removed, exposing the endless chain and the pulleys on which it travels. Fig. 3 represents an enlarged detached view of two of the cutters and one connecting-link. Fig. 4 represents a front elevation of the harvester with a portion cut away, in order to show more clearly the operation of the beveled gearing for transmitting motion to the cutters; and Fig. 5 represents an enlarged detached view of a modification of the knives and connecting-link.

The letter A represents the truck or frame of the harvester mounted upon a transverse shaft, B, and provided in front with the usual draft-pole C. Said shaft or axle is journaled in bearings D at the sides of the truck, and is adapted to rotate freely therein. The letter E represents the wheels, which are loosely fitted to the axle B, and which are provided with transverse ridges F to prevent slipping.

To the axle B, immediately adjoining the inner faces of the wheels E, are rigidly secured ratcheted disks, and to the said wheels are secured spring-pawls adapted to engage the ratchets in the disks, so as to rotate the axle with the wheels when the harvester is going forward, and allow the wheels to slip on the axle and arrest the motion of the working parts when the harvester is backing. This feature being common in mowing-machines, I have thought it unnecessary to illustrate it in my drawings.

Upon the axle B is keyed a sleeve, I, capable of a longitudinal movement on the shaft and carrying two reversely-set beveled gear-wheels, K. The letter L represents a bifurcated lever, which straddles and is secured to said sleeve, the lower ends of said lever being fulcrumed to a frame, G, pivoted to the axle of the harvester.

The letter M, Fig. 4, represents a shaft journaled in the frame immediately below its axle, and having mounted on its upper end a beveled gear-wheel, N, which lies between the wheels K in such position that either of said wheels may be thrown into gear with the said wheel N. On the lower end of the shaft M is mounted a pulley, P, from which extends an endless chain, R, to the driving-pulley S of the cutter-chain, both of said pulleys being provided with sprockets to engage the links of the chain and prevent slipping. The said pulley S is mounted on a shaft, T, journaled in bearings in the finger-bar H and its cover U, and on said shaft, under the cover, is secured a pulley, W, which, with the pulley Z, adjustably secured to the opposite end of the finger-bar H, serves to carry the endless knife-chain.

The said knife-chain is composed of a series of triangular blades, A', which are formed with reversely-set hooks $a^1$, and are connected together by means of a series of links, B'. These hooks are arranged within the lateral limits of the heels of the cutters, leaving a projecting corner of the heel outside of each hook, so that when the hooks are all connected by loop-links a very flexible chain is formed, and one that may be effectively carried by circular pulleys. The said hooks may be formed in one piece with the blades, as shown in Fig. 3, in the shape of a vertical extension, $a^2$.

The pulley Z, before mentioned, is mounted on a shaft, H', adjustably secured in the slots C' C' in the finger-bar and its cover, and the endless cutter-chain passes around said pulley and the pulley W, the latter being provided with teeth $w$, which engage the links and give the chain a positive motion.

The letter D' represents an abutment located immediately behind the line of travel of the front portion of the endless cutter-chain, which serves as a support to the bases of the knives and to hold them forward to their work.

The cover U is cut away at its lower front edge, as shown at I', Fig. 4, to form a passage for the cutters, which are adapted to travel across the fingers E' in either direction desired, as more fully hereinafter explained.

The letter F', Fig. 1, represents a lever pivoted to the front of the truck, from which extends a chain, G', to the frame G, by means of which said frame, and with it the finger-bar and cutters with their operating mechanism, may be elevated.

The operation of my invention is as follows: When the harvester is started in a forward direction the wheels, by means of their pawls, carry the ratcheted disks and the axle with them, rotating the shaft and the beveled gear-wheels mounted thereon. One or the other of said beveled gear-wheels being thrown into gear with the beveled wheel below, as may be desired, causes the shaft of said wheel to revolve in one or the other direction, according to the wheel engaging said wheel, and imparting a corresponding motion to the driving-pulley of the cutter-chain, causing said chain to move either way, accordingly as the beveled wheels are geared, as before mentioned. The pivoted frame which carries the finger-bar may be elevated to any desired level by means of its lever and chains, and as the position of the beveled wheel journaled in said frame is always such that one or the other of the wheels on the axle may be kept in gear with it, the working parts of the harvester may be kept in operation, no matter at what elevation the finger-bar may be held.

What I claim is—

1. The endless cutter-chain consisting of the triangular cutters having formed at their heels the reversely-set hooks, outwardly beyond which project the corners of said heels, and the separate loop-links by which the cutters are connected, substantially as described.

2. The combination, with the endless cutter-chain formed of the separate cutters, provided at their heels with reversely-set hooks connected by loop-links, of the sprocketed or toothed pulley W, mounted on shaft T, the adjustable round pulley Z, the finger-bar, the pulley S, mounted also on the shaft T, and a suitable device for driving said pulley, substantially as described.

In testimony that I claim the foregoing I have hereunto set my hand and seal in the presence of the subscribing witnesses.

CARSON F. HOWES. [L. S.]

Witnesses:
 WILLIAM BARNES,
 EDWARD F. JOHNSON.